(12) United States Patent
Lee et al.

(10) Patent No.: US 8,457,240 B2
(45) Date of Patent: Jun. 4, 2013

(54) METHODS OF SELECTING SIGNAL TRANSMITTING, RECEIVING, AND/OR SENSING DEVICES WITH PROBABILISTIC EVOLUTIONARY ALGORITHMS IN INFORMATION CONVEYANCE SYSTEMS

(76) Inventors: Daniel Lee, Burnaby (CA); Muhammad Naeem, Surrey (CA)

(*) Notice: Subject to any disclaimer, the term of this patent is extended or adjusted under 35 U.S.C. 154(b) by 947 days.

(21) Appl. No.: 12/547,477

(22) Filed: Aug. 25, 2009

(65) Prior Publication Data

US 2010/0232533 A1 Sep. 16, 2010

Related U.S. Application Data

(60) Provisional application No. 61/136,282, filed on Aug. 25, 2008.

(51) Int. Cl.
| | |
|---|---|
| H04B 15/00 | (2006.01) |
| H04B 3/32 | (2006.01) |
| H04L 25/03 | (2006.01) |
| H04L 25/497 | (2006.01) |
| H04B 3/23 | (2006.01) |

(52) U.S. Cl.
CPC ............ *H04B 3/32* (2013.01); *H04L 25/03343* (2013.01); *H04L 25/497* (2013.01); *H04B 3/23* (2013.01); *H04L 25/03057* (2013.01)
USPC ........... 375/285; 375/296; 455/346; 375/377; 455/63.1; 455/63.4

(58) Field of Classification Search
USPC ......... 375/130, 140, 147–148, 224, 229–232, 375/259–260, 285, 295, 309, 315, 316, 346, 375/349, 377; 455/7, 25, 39, 63.1, 63.4, 91, 455/120, 121
See application file for complete search history.

(56) References Cited

U.S. PATENT DOCUMENTS

| | | | |
|---|---|---|---|
| 5,871,400 A | 2/1999 | Yfantis | |
| 6,141,392 A | 10/2000 | Hoshikuki | |
| 6,741,635 B2 * | 5/2004 | Lo et al. | 375/144 |
| 7,212,795 B2 | 5/2007 | Liu | |
| 7,248,843 B2 | 7/2007 | Carvalho | |
| 7,327,983 B2 | 2/2008 | Mehta | |
| 7,428,514 B2 * | 9/2008 | Jin et al. | 706/13 |

(Continued)

OTHER PUBLICATIONS

G. J. Foschini and M. J. Gans, "On limits of wireless communications in a fading environment when using multiple antennas," Wireless Personal Communications, vol. 6, pp. 311-335, 1998.

(Continued)

*Primary Examiner* — David C. Payne
*Assistant Examiner* — James M Perez

(57) ABSTRACT

Methods are described for near optimal Antenna and/or sensor selection via population-based probabilistic evolutionary algorithms such as estimation of distribution algorithm (EDA) and bio-inspired Optimization (BIO). The aspects of the invention includes a method for joint transmit and receive antenna selection using EDA; and an enhanced EDA, which uses cyclic shift register and biased estimation of distribution; and methods for joint transmit and receive antenna selection using improved population-based optimization. The proposed EDA-based and bio-inspired selection methods results in performances that are close to the ESA (exhaustive search algorithm) and yet impose mush less computational burden than ESA. Another advantage of our methods is that they can be easily implemented on parallel processors.

49 Claims, 8 Drawing Sheets

U.S. PATENT DOCUMENTS

| | | | | |
|---|---|---|---|---|
| 7,492,830 | B2* | 2/2009 | Bocquet | 375/267 |
| 7,502,764 | B2* | 3/2009 | Son et al. | 706/13 |
| 7,933,629 | B2* | 4/2011 | Kwon et al. | 455/562.1 |
| 7,979,365 | B2* | 7/2011 | Goldberg et al. | 706/13 |
| 8,064,407 | B2* | 11/2011 | Wang et al. | 370/334 |
| 8,072,311 | B2* | 12/2011 | Sadr et al. | 340/10.1 |
| 8,131,656 | B2* | 3/2012 | Goldberg et al. | 706/13 |
| 8,140,024 | B2* | 3/2012 | Prasad et al. | 455/69 |
| 8,199,853 | B2* | 6/2012 | Kim et al. | 375/299 |
| 8,213,530 | B2* | 7/2012 | Lee et al. | 375/267 |
| 8,259,836 | B2* | 9/2012 | Xia et al. | 375/267 |
| 8,275,058 | B2* | 9/2012 | Sandell et al. | 375/260 |
| 2004/0043795 | A1* | 3/2004 | Zancewicz | 455/562.1 |
| 2004/0090938 | A1* | 5/2004 | Hsu | 370/335 |
| 2006/0293045 | A1* | 12/2006 | LaDue | 455/423 |
| 2008/0013638 | A1* | 1/2008 | Walton et al. | 375/260 |
| 2008/0183648 | A1* | 7/2008 | Goldberg et al. | 706/13 |
| 2009/0299717 | A1* | 12/2009 | Zhao et al. | 703/14 |
| 2010/0158159 | A1* | 6/2010 | Lee et al. | 375/340 |
| 2011/0138255 | A1* | 6/2011 | Lee | 714/777 |
| 2011/0188547 | A1* | 8/2011 | Catreux-Erceg et al. | 375/147 |
| 2011/0249760 | A1* | 10/2011 | Chrisikos et al. | 375/259 |
| 2011/0261899 | A1* | 10/2011 | Walton et al. | 375/295 |

OTHER PUBLICATIONS

E. Telatar, "Capacity of multiantenna Gaussian channels," European Transactions on Telecommunications, vol. 10, No. 6, p. 585-596, 1999.

I. Berenguer et al. "Transmit Antenna Selection in Linear Receivers: Geometrical Approach." Electronics Letters, vol. 40 No. 5. Mar. 2004 pp. 292-293.

A. Molisch et. al., "Capacity of MIMO systems with antenna selection," IEEE Transactions on Wireless Communications, vol. 4, Issue 4, pp. 1759-1772, Jul. 2005.

A. Gorokhov et al., "Receive antenna selection for MIMO spatial multiplexing: theory and algorithms," IEEE Trans. Signal Processing, vol. 51, No. 11, pp. 2796-2807, Nov. 2003.

D. Gore et al., "MIMO antenna subset selection with space-time coding," IEEE Trans. Signal Processing, vol. 50, pp. 2580-2588, Oct. 2002.

D. Gore, R Heath, and A. Paulraj, "Transmit selection in spatial multiplexing systems," IEEE Comm.. Lett., vol. 6, pp. 491-493, Nov. 2002.

S. Sanayei et al., "Antenna selection in MIMO systems," IEEE Comm.. Mag., vol. 42, No. 10, pp. 68-73, Oct. 2004.

M. Gharavi-Alkhansari and A. B. Gershmam, "Fast antenna subset selection in MIMO systems," IEEE Trans. Signal Processing, vol. 52, No. 2, pp. 339-347, Feb. 2004.

K.T.Phan et. al., "Receive Antenna Selection Based on Union-Bound Minimization Using Convex Optimization," IEEE Signal Processing Letters, vol. 14, No. 9, pp. 609-612, Sep. 2007.

P. Larrañaga and J. A. Lozano, Estimation of Distribution Algorithms: A New Tool for Evolutionary Computation. Kluwer Academic Publishers, Boston, 2002c. ISBN 0-7923-7466-5.

G. H. Golu et al., Matrix Computations, Baltimore: The Johns Hopkins Univ. Press, 1983c, ISBN 0801830109.

A. Gorokhov et. al.,"Transmit/receive MIMO antenna subset selection", in Proc. IEEE ICASSP, vol. 2, pp. II-13-16,2004.

J. Kennedy and R. Eberhart, "Particle Swarm Optimization," Proc. of IEEE Int'l Conf. on Neural Networks, pp. 1942-1948, 1995.

J. Kennedy and R. Eberhart, "A Discrete Binary Version of the Particle Swarm Optimization", Proc. of the Conference on Systems, Man, and Cybernetics, pp. 4104-4108, 1997.

D. Simon, "Biogeography-Based Optimization," IEEE Transactions on Evolutionary Computation, vol. 12, No. 6, pp. 702-713, Dec. 2008.

K.-H. Han and J.-H. Kim, "Quantum-inspired evolutionary algorithm for a class of combinatorial optimization," IEEE Transactions on Evolutionary Computation, vol. 6, No. 6, pp. 580-593, Dec. 2002.

* cited by examiner

Concatenation of population generated by TX and RX cyclic shift

METHODS OF SELECTING SIGNAL TRANSMITTING, RECEIVING, AND/OR SENSING DEVICES WITH PROBABILISTIC EVOLUTIONARY ALGORITHMS IN INFORMATION CONVEYANCE SYSTEMS

CROSS-REFERENCE TO RELATED APPLICATIONS

This application claims the benefit of provisional patent application No. 61/136,282 filed 25 Aug. 2008 and entitled JOINT TRANSMIT AND RECEIVE ANTENNA SELECTION METHODS WITH PROBABILISTIC EVOLUTIONARY ALGORITHMS.

TECHNICAL FIELD

The invention relates to data communication and signal processing, especially, data communication in which multiple transmit and/or receive antennas are used.

BACKGROUND

Multiple-input-multiple-output (MIMO) communication systems can have significantly higher channel capacity than single-input-single-output (SISO) systems for the same total transmission power and bandwidth [1]. In wireless communications, MIMO systems have the ability to deal with multipath propagation [1] [2]. It is also known that capacity of MIMO systems increases with the number of antennas. However, in practical communication systems, combining signals carried by a larger number of antennas increases the number of RF chains, which increases the cost of the overall system. In [4], Molisch et al. showed that hardware cost can be significantly reduced by selecting a good subset of antennas from the set of physically available antennas and using the signals from the selected antennas only, without much sacrificing the advantage of multi antenna diversity. Which subset of antennas is good depends on the channels' conditions. Therefore, one can embody a MIMO communication system that has a larger number of antennas than the number of RF chains and selects, on the basis of the channels' conditions, a subset of antennas to which to connect the RF chains. Therefore, a need exists for antenna selection scheme that has low computational complexity and better performance. Especially, for wireless communications, the channels conditions can vary in time rapidly and the communication systems may have to change its selection of the antennas frequently in order to maintain high performance in communication. Therefore, computational efficiency of the antenna selection algorithm is important for adapting the antennas selection quickly to changing channel conditions.

No polynomial-time algorithm is known to select the antennas optimally. Finding an optimal selection of antennas can require a large amount of processing at the receiver side and thus result in a long processing delay and high processing power consumption. Due to the high computational complexity of the optimal selection, a number of suboptimal solutions with lower complexity were proposed in literature [5] [6] [7] [8] [9] [10]. There are a few patents on antenna selection method, e.g. for joint transmit/receive antenna selection [I] and receive antenna selection [II] [III] [IV]. The complexity an algorithm and the performance of a MIMO communication system depend on the number of transmit/receive antennas; i.e., complexity of an algorithm increases with the number of antennas and the performance of a MIMO communication system improves if the number of antennas increases.

A major aim for transmit or receive antenna selection schemes in the literature is to determine a good selection of antennas with low computational complexity. Different receive antenna selection algorithms are proposed in [5][6] [8][9][10], and similarly a number of transmit antenna selection algorithms are proposed in [3][4][7]. All these proposed algorithms are presented to reduce the complexity of antenna selection while obtaining a good selection. There is tradeoff between the goodness of a selection and the computational amount to determine the selection. Our proposed transmit and/or receive antenna selection algorithm shows a better goodness-computation tradeoff.

Most of the antenna selection schemes are either proposed for receive antenna selection [4][5][6][7][8][9][10] or transmit antenna selection [1][2][3] separately. The main drawback of separate antenna selection is that hardware cost can only reduce at one side (either transmit side or receive side). In [13] authors proposed a kind of joint antenna selection scheme by performing separate exhaustive search on transmit and receive side. (This technique is termed as Decoupled antenna selection.) Decoupled antenna selection has two disadvantages 1) its complexity is high and 2) its performance is not close to the optimal performance. Our proposed joint antenna selection algorithm not only searches for a near optimum solution in real time but also has low computational complexity than all previous joint antenna selection algorithms.

SUMMARY OF THE INVENTION

This invention provides methods and apparatus for selecting, inter alia, antennas on transmitter, and/or receiver in multi-antenna communication systems, for selecting antennas and/or users in multi-user and/or multi-antenna communication systems, and for selecting sensors in a system comprising multiple sensors. The invention may be embodied in numerous engineering systems comprising multiple sensors and communication systems. One aspect of the invention provides methods that cope well with externally imposed constraints on antenna and/or sensor selections such as the maximum number of antennas that can be in use and/or the maximum number of sensors that can be in operation at a time frame.

Embodiments of our method use and configure population-based evolutionary algorithms, and an aspect of the invention provides methods of generating initial populations for these algorithms. Such methods include representing a possible solution by a vector and generating multiple vectors by choosing an initial feed vector and its cyclic shifts. Another aspect of the invention allows the methods to configure the population-based algorithm in order to prevent premature convergence to a local optimum.

Another aspect of the invention also allows applying biased weights in estimating probability distributions used in generating populations in the case of employing an Estimation-of-Distribution algorithm (EDA).

Further aspects of the invention and features of specific embodiments of the invention are described below.

DETAILED DESCRIPTION OF THE INVENTION

Figure 1:
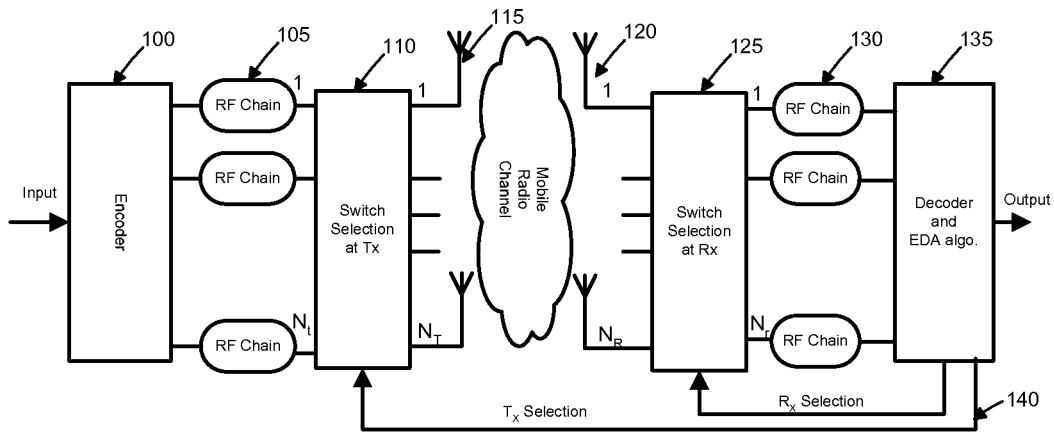
FIG. 1 illustrate a block diagram of joint transmit/receive antenna selection system in accordance with a preferred application of the present invention.

1. Model of a Communication System with Multiple Transmit Antennas and/or Multiple Receive Antennas We consider an embodiment of a MIMO (Multiple-Input-Multiple-Output) system FIG. 1 with $N_T$ 115 transmit antennas and $N_R$ received antennas 120. There are $N_r$ RF chains 130 at the receiver and $N_t$ RF chains 105 at the transmitter. It is assumed that channel state information (CSI) is known at the receiver. This assumption is reasonable if training or pilot signals are sent to learn the channel, which is almost constant for some coherence time interval. On the basis of this known CSI, the receiver will select $N_r$ RF chains 130 from $N_R$ received antennas 120. The channel information is provided to the transmitter through a feedback channel 140. On the basis of this feedback information, the transmitter selects $N_t$ RF chains 105 from $N_T$ transmit antennas 115. Source symbols are mapped into a modulation scheme such as M-PSK, M-FSK or M-QAM. Assuming that the mobile radio channel gain remains constant during one block of data, we can mathematically represent the signal received at the receiver as $$Y = \sqrt{\frac{E_s}{N_T}} HS + Z \qquad (1)$$

where $E_s$ is the total energy available at the transmitter during a symbol period, $Y \equiv [Y_1 \, Y_2 \ldots Y_{N_R}]^T \in \mathbb{C}^{N_R \times 1}$ is the received matrix, $S \equiv [S_1 \, S_2 \ldots S_{N_T}]^T \in \mathbb{C}^{N_T \times 1}$ is the matrix of transmitted symbols, channel matrix is $H \in \mathbb{C}^{N_R \times N_T}$, and additive noise vector $Z \equiv [Z_1 \, Z_2 \ldots Z_{N_R}]^T \in \mathbb{C}^{N_R \times 1}$. Z is the complex additive white Gaussian noise with zero mean and variance $N_o/2$ per dimension. For any H, the capacity of the MIMO system is [2][4]

$$C(H) = \log_2 \det\left(I_{N_T} + \frac{E_s}{N_o N_T} H^H H\right) \qquad (2)$$

or $$C(H) = \log_2 \det\left(I_{N_R} + \frac{E_s}{N_o N_T} H H^H\right)$$

where $I_{N_x}$ is the identity matrix, and $(\bullet)^H$ represents the Hermitian transpose. We denote by $\Phi$ the collection of all transmit/receive antenna combinations Then, the number of possible selections are $$|\Phi| = \binom{N_R}{N_r} \times \binom{N_T}{N_t}$$

where $N_r \leq N_R$ and $N_t \leq N_T$. For these $|\Phi|$ subsets the maximum capacity associated with joint transmit/receive antenna is $$C(H^\phi) = \underset{\phi \in \Phi}{\mathrm{argmax}} \log_2 \det\left(I_{N_t} + \frac{E_s}{N_o N_t} (H^\phi)^H (H^\phi)\right) \qquad (3)$$

or $$C(H^\phi) = \underset{\phi \in \Phi}{\mathrm{argmax}} \log_2 \det\left(I_{N_r} + \frac{E_s}{N_o N_t} (H^\phi)(H^\phi)^H\right)$$

where $C(H^\phi)$ is the capacity achieved by selecting $N_r$ receive and $N_t$ transmit antennas, $H^\phi \in \mathbb{C}^{N_r \times N_t}$ and $E_s/N_o$ is the mean SNR per receive branch. We denote by $\phi$ the selected subset of transmit and receive antennas. We index $\phi$ by binary a string $$Q = [q_1^T, q_2^T, \ldots, q_{N_T}^T, q_1^R, q_2^R, \ldots, q_{N_R}^R], \qquad (4)$$
$$q_i^T \in \{0,1\} \text{ and } q_j^R \in \{0,1\}$$

where $q_i^T$ is a binary indicator of whether antenna i is selected or not from $N_T$ transmit antennas. Similarly $q_j^R$ is a binary indicator of whether antenna j is selected or not from $N_R$ receive antennas For example, let us consider a case with $N_T=4$, $N_t=2$ and $N_R=5$, $N_r=3$. Suppose that the first and third antenna are selected from transmit antennas and the first, second and fifth antenna are selected from receive antennas. Then $\phi$ representing this selection will be [1, 0, 1, 0, 1, 1, 0, 0, 1]. Exhaustive Search Algorithm (ESA) evaluate all possible $|\Phi|$ combinations, enumerating over all possible combinations and finding the one that can maximize the (3) is computationally inefficient, and a computationally efficient algorithm is not known. Computational complexity increases exponentially with number of transmit and receive antennas. High-speed communications demand a method with lower complexity.

2. Estimation of Distribution Algorithm (EDA) for Antenna Selection

We now present a method for joint transmit and receive antenna selection that utilizes Estimation of Distribution Algorithms (EDAs). EDAs are population based search algorithms that rely on probabilistic modeling of potential solutions. Generally in evolutionary algorithms, two fixed parents recombination and evolution often provide poor quality solution, causing a premature convergence to a local optimum. To overcome this problem, in EDAs the recombination process is replaced by generating new potential solutions according to the probability distribution of good solutions from the previous iteration. In estimating the probability distribution, the interdependence of variables remains intact. Thus, EDAs can consider interactions among variables.

Figure 2:
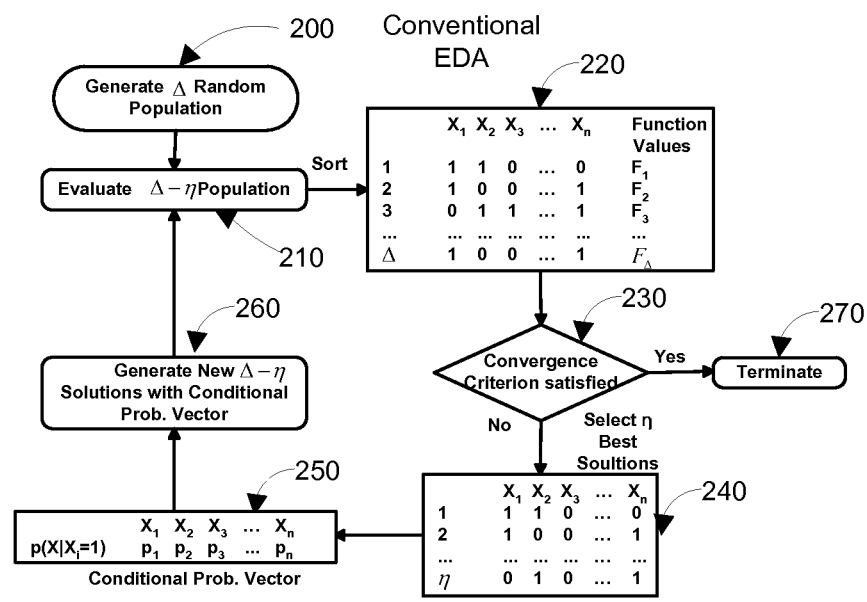
FIG. 2 is a flow chart of conventional Estimation of Distribution Algorithms
Figure 3:
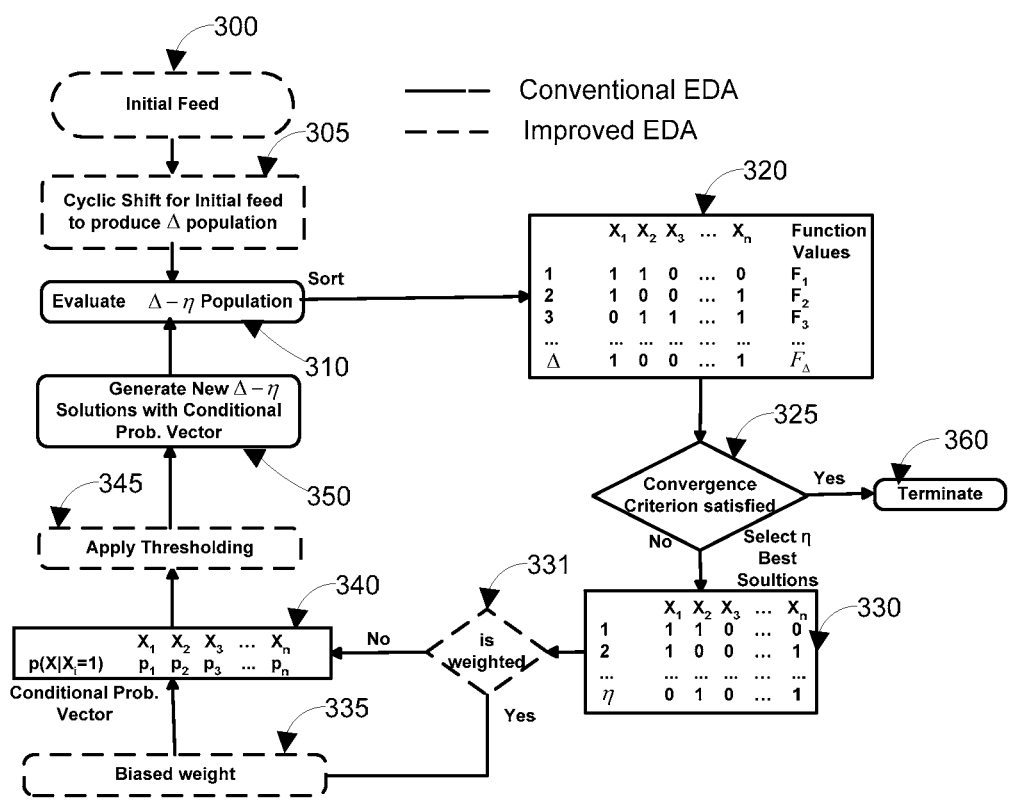
FIG. 3 is a flow chart of the improved method of applying an EDA by adding a threshold on estimated distributions and cyclic shifted initial population.
Figure 4:
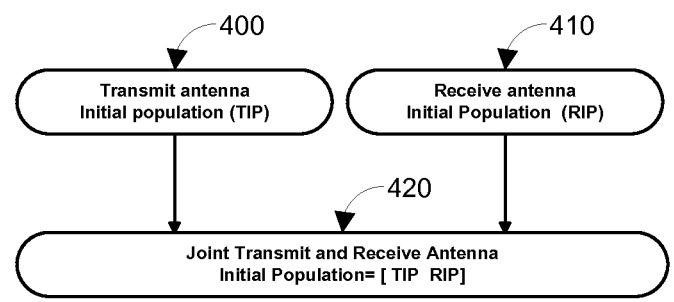
FIG. 4 illustrates the composition of EDA population individual.

A typical, conventional EDA is illustrated in FIG. 2. In evolutionary algorithms, new population of individuals is generated at each iteration. The composition of these individuals is shown in FIG. 4. These individuals are selected at each iteration, from the pool, which contains only the best individuals from the previous iterations. In EDAs, the new population individuals are generated without crossover and mutation operators (as in other evolutionary algorithm); instead, new population individuals are generated based on a probability distribution, which is estimated form the pool of previous iteration.

In general, conventional EDAs can be characterized [11] by parameters ($I_s$, F, $\Delta_l$, $\eta_l$, $p_s$, $D_{es}$, $F_{Ter}$), where
1. $I_s$ is the space of all potential solutions (entire search space of individuals).
2. F denotes a fitness function.
3. $\Delta_l$ is the set of individuals (population) at the $l_{th}$ iteration.
4. $\eta_l$ is the set of best candidate solutions selected from set $\Delta_l$ at the lth iteration.
5. $p_s = |\eta_l|/|\Delta_l|$ is called selection probability.
6. $D_{es}$ is the distribution estimated from $\eta$ (the set of selected candidate solutions) at each iteration.
7. $F_{Ter}$ is the termination criteria.

A typical EDA is illustrated in FIG. 2, which is described as follows:

Step 1: Generate initial population randomly 200. Typically, each individual is designated by a binary string of length n (n-dimensional binary vector). The initial population (A|$\Delta_l$| individuals) is typically obtained by sampling according to the uniform distribution [11]:

$$p(X^j) = \prod_{i=1}^{n} p(x_i^j), \forall j = \{1, 2, \ldots, |\Delta_l|\}, \quad (5)$$

and $$p(x_i = 1) = p(x_i = 0) = 0.5, i = 1, 2, \ldots, n,$$

where binary n-dimensional vector, $X^j = (x_1^j, x_2^j, x_3^j, \ldots, x_n^j)$, $x_i^j \in (0,1)$ represents an individual. The current population can be written in a matrix form $$X = \begin{pmatrix} X^1 \\ X^2 \\ \vdots \\ X^{|\Delta_l|} \end{pmatrix} = \begin{pmatrix} x_1^1 & x_2^1 & \vdots & x_n^1 \\ x_1^2 & x_2^2 & \vdots & x_n^2 \\ \ldots & \ldots & \ldots & \ldots \\ x_1^{|\Delta_l|} & x_2^{|\Delta_l|} & \vdots & x_n^{|\Delta_l|} \end{pmatrix} \quad (6)$$

where each row of matrix X represents an individual in the population.

Step 2: Evaluate the current population according to the fitness function F 210. Sort the candidate solutions according to their fitness orders 220. Last sorted candidate solution is the best candidate solution for all iterations.

Step 3: If the best candidate solution satisfies the convergence criterion 230 or the number of iterations exceeds its limit then terminate 270 else go to step 4.

Step 4: Select the best $\eta_l$ candidate solutions 240 from current $\Delta_l$ individuals. This selection is accomplished according to the sorted solutions 220.

Step 5: Estimate the probability distribution $P(x_1, x_2, \ldots, x_n)$ 250 on the basis of |$\eta_{l-1}$| best candidate solutions. We denote this estimation by $$D_{es} = P(x_1, x_2, \ldots, x_n | \eta_{l-1}) \quad (7)$$

Step 6: Generate new |$\Delta_l$|−|$\eta_l$| populations according to this new estimated probability distribution $D_{es}$ 260.

Step 7: Go to step 2 and repeat the steps

An EDA can get stuck in a local optimum due to premature convergence of the probability distributions. We present a preferred method of avoiding this problem by adding a threshold 345 on estimated distributions. Any of probability $p_1, p_2 \ldots p_n$ in 340 can converge to 1 or 0 prematurely. We present a mechanism that thwarts such premature convergence; namely, we present an idea of adjusting the distribution $p_1, p_2 \ldots p_n$ after estimating these at each iteration. The adjustment in general can be described as a mapping from set of n-dimensional vectors, $\Pi \equiv \{(p_1, p_2, \ldots, p_n) | 0 \leq p_i \leq 1, i=1, 2, \ldots, n\}$, to set $\Pi$ itself. A preferred embodiment of this idea is to use thresholds. First we address the problem that a probability value prematurely converges to 1. To avoid this, we define thresholds $0.5 < \gamma_1, \gamma_2, \ldots, \gamma_n < 1$. At any iteration, if the probability value in $p_i$, i=1, 2, \ldots, n, is greater than $\gamma$, we set that value to $\gamma_i$, so that some degree of randomness remains in the algorithm until the termination criterion is satisfied. A simpler application of this idea is to set the same threshold $\gamma = \gamma_1 = \gamma_2 = \ldots = \gamma_n$. Now we address the problem that a probability value prematurely converges to 0. We define thresholds $0 < \alpha_1, \alpha_2, \ldots, \alpha_n < 0.5$. At any iteration, if the probability value in $p_i$, i=1, 2, \ldots, n, is less than $\alpha_i$, we set that value to $\alpha_i$, so that some degree of randomness remains in the algorithm until the termination criterion is satisfied. A simpler application of this idea is to set the same threshold $\alpha = \alpha_1 = \alpha_2 = \ldots = \alpha_n$.

We introduce three modifications in conventional EDAs to improve the efficiency of the proposed joint antenna selection method. The modifications are 1) a predefined initial feed 300 2) cyclic shifted initial population 305 and 3) biased Estimation of Distribution. In conventional EDAs initial population is generated randomly from the uniform distribution. We present a method of selecting an initial population to make the average convergence time (the number of iterations until reaching an acceptable solution) shorter than the randomly generated initial population. The idea is to contrive the initial population by utilizing domain knowledge of the MIMO system and/or the dynamics of the EDAs evolution. A preferred embodiment of this idea is to use a promising initial selection of antennas (initial feed), which is represented by a binary string $X^0$, and then to use cyclic shifts of this binary string $X^0$ as initial population. In the joint antenna selection problem, a preferred implementation of the present invention is to set the length of binary string $X^0$ (dimension of vector) $X^0$ to be the total number of antennas (both transmit and receive antennas). Exemplary methods of choosing the initial feed include 1) adjacent antenna method 500,505 and 2) best antennas method 600,605.

Figure 5:
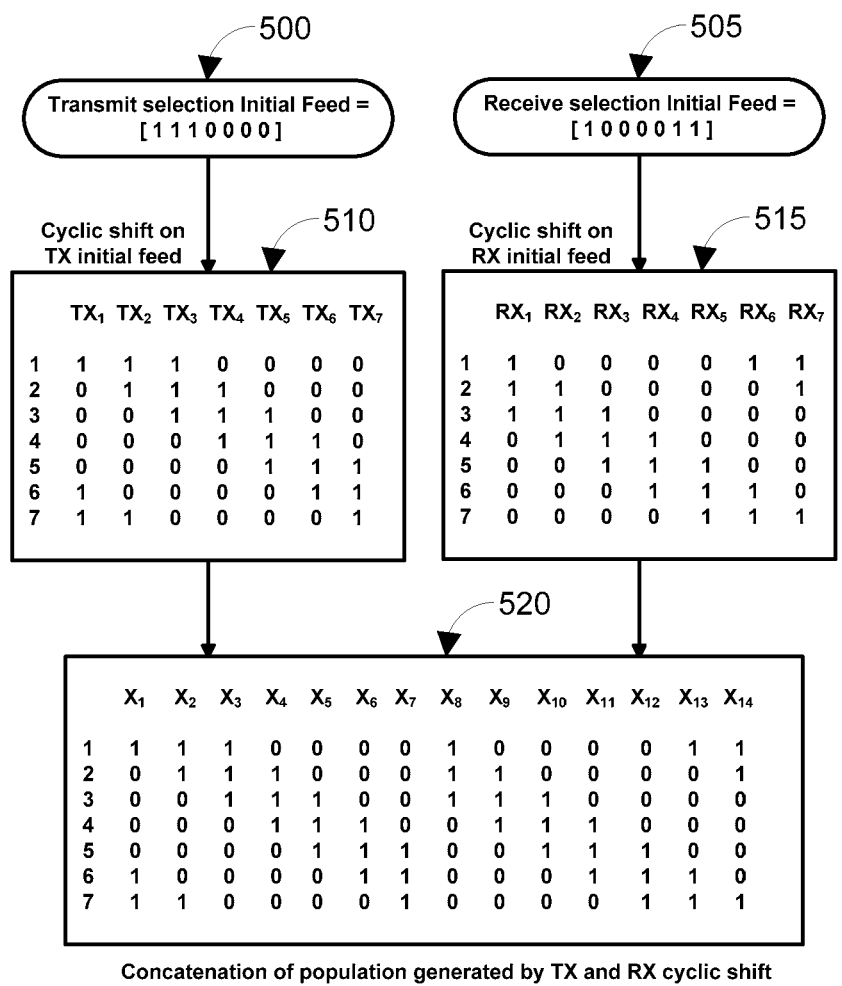
FIG. 5 illustrates the cyclic shifted operation on adjacent antennas.

Adjacent feed methods are illustrated in FIG. 5. The following example uses $N_R=7$, $N_r=3$, $N_T=7$ and $N_t=3$ as the initial parameters to illustrate the idea of present invention. In adjacent antenna feed, for receive antenna selection $N_r$ bits are set to one and placed adjacent to each other 505. Similarly $N_t$ bits are set to one and placed adjacent to each other 500. The present invention also introduces a non-restricted starting index of adjacent antennas. The start index can be from one to number of transmit/receive antennas. In 500 the start index of the adjacent $N_t$ bits is one, whereas start index of $N_r$ bits is six. This non-restricted starting index introduces a cyclic adjacency. If the start index of adjacent antenna is more than $N_R - N_r + 1$ (receive selection) or $N_T - N_t + 1$ (transmit selection) then a cyclic adjacency is applied, e.g., if $N_R = 7$, $N_r = 3$ and start index of adjacent term is six (as shown in 505) then the initial feed will be [1 0 0 0 0 1 1]. We call this initial feed as individual of transmit and receive antenna selection. The present invention also introduces an initial feed based on best channel conditions FIG. 6. This initial feed not necessarily be the adjacent. These initial feed antennas can be placed at any index 600 and 605. Same procedure is applied in 610 and 615 as in 510 and 515.

In the next stage of initialization a cyclic shift is applied on these transmit initial feed 510 and receive initial deed 515. This cyclic shift process is used to generate the initial population from these initial feeds. The cyclic shifted initial population ensures that each antenna has equal contribution during starting phase of the proposed algorithm. In the process of cyclic shift, last element (Most Significant Bit) of the initial feed becomes the first element (Least Significant Bit) and all other elements are shifted right. The process of cyclic shift is repeated till we get the original initial feedback. This cyclic shift can be done in reverse order.

After generating initial population of transmit and receive antennas separately, concatenate these transmit/receive initial populations. Concatenation procedure is shown in FIG. 4 at (420), transmit antenna initial population (TIP) 400 and receive antenna initial population (RIP) 410 are concatenated as [TIP RIP] 420. This concatenation reduces the execution time of the algorithm by determining probability distribution of transmit and receive antenna simultaneously. Since most of the hardware in practice are sequential, if separate selection of antenna is implemented for transmit and receive population then time complexity will be double. The increase in complexity is due to separate execution of EDA algorithm for transmit and receive antennas.

To obtain an acceptable solution (a near-optimum solution) in an efficient way, the present invention also includes an idea of adding some skew in estimating the probability distribution from a population, which is a modification 331,335 to (7). This skew can be added by giving more weights to the individuals in that have better fitness in estimating the probability distribution $P(x_1, x_2, \ldots, x_n)$. We now provide an illustrative embodiment of this idea. Note that estimation (7) is often implemented in the following simple way:

$$D_{es} = \prod_{i=1}^{n} P(x_i | \Omega_i^{l-1}), \text{ where } \Omega_i^{l-1} = \left(x_i^1 \ x_i^2 \ \ldots \ x_i^{|\eta_{l-1}|}\right)^T$$

is the $i_{th}$ column vector from matrix X and $P(x_i|\Omega_i^{l-1})$ is the estimated probability from the selected $|\eta_{l-1}|$ individuals in the $(l-1)_{th}$ iteration 240,250. A simple embodiment of the skewed estimation $\tilde{D}_{es}$ is $$\tilde{D}_{es} = \prod_{i=1}^{n} P\left(x_i | \tilde{\Omega}_i^{l-1}\right) \quad (8)$$

where $\tilde{\Omega}_i^{l-1}$ is the biased column vector determined through point by point multiplication of weight vector $\omega=[\omega_1 \ \omega_2 \ldots \omega_{|\eta_{l-1}|}]^T$ and i.e., $\tilde{\Omega}_i^{l-1}=[\omega_1 x_i^1 \ \omega_2 x_i^2 \ldots \omega_{|\eta_{l-1}|} x_i^{|\eta_{l-1}|}]^T$. These weights are applied in accordance with the fitness order of the selected population at $(l-1)_{th}$ iteration. The weights are normalized and calculated to satisfy the condition that, $\omega_{|\eta_l|} > \ldots \omega_2 > \omega_1$, and $$\sum_{i=1}^{\eta} \omega_i = 1.$$

Again, and example choice of the weights include $$\omega_i = \frac{\log(|\eta_l|) - \log(i)}{\sum_{i=1}^{|\eta_l|} [\log(|\eta_l|) - \log(i)]}, i = 1, 2, \ldots, |\eta_l| \quad (9)$$

$$\omega_i = \frac{|\eta_l| - i}{\sum_{i=1}^{|\eta_l|} [|\eta_l| - i]}, i = 1, 2, \ldots, |\eta_l| \quad (10)$$

Figure 6:
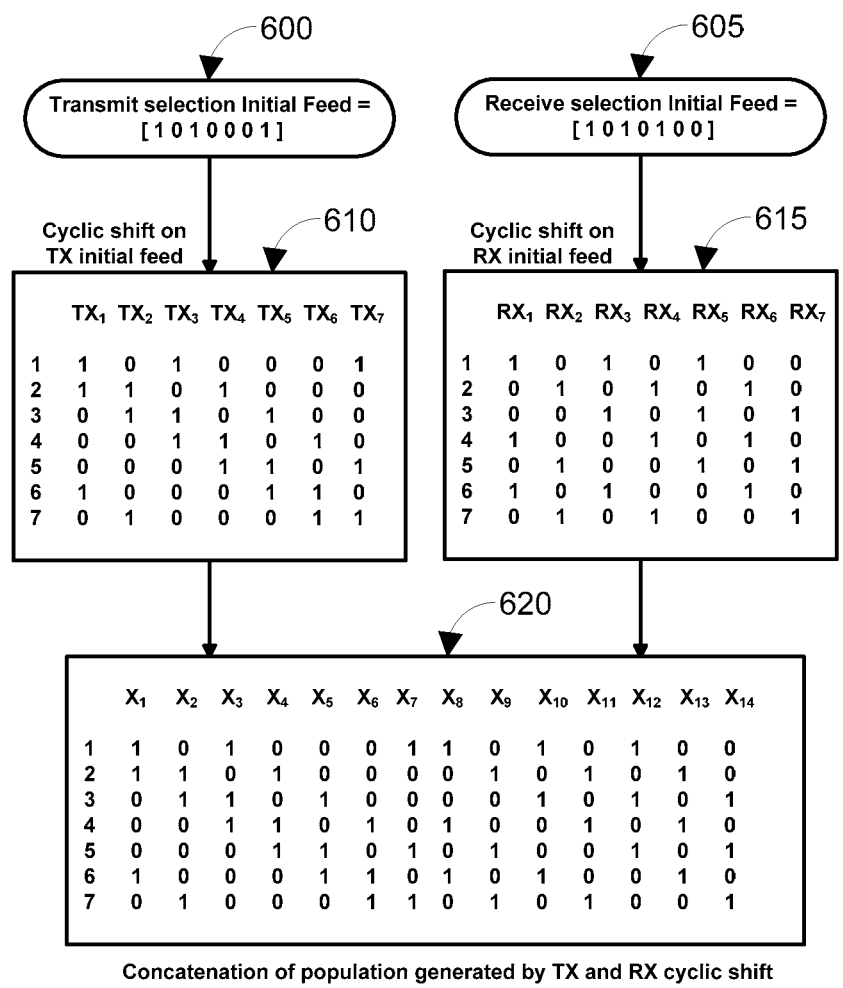
FIG. 6 illustrates the cyclic shifted operation on best selected transmit and receive antennas

To illustrate biased estimation of distribution idea in detail, assume that $N_R=7$, $N_r=3$, $N_T=7$, $N_t=3$, $\Delta_i=10$ and $|\eta_l|=5$ are defined as initial parameters. Generate initial population as shown in FIG. 5 and FIG. 6. Apply steps 305,310,320,325 and 331, if 331 is true then use 335 (biased weights). To calculate normalized weight we need the number of best population i.e., η. Use (9) to calculate the normalized weights, we will get $\omega=[0.0437 \ 0.0972 \ 0.1662 \ 0.2634 \ 0.4295]^T$, similarly for (10) the weights are $\omega=[0.0667 \ 0.1333 \ 0.2000 \ 0.2667 \ 0.3333]^T$. It is observed from the above data that logarithmic weights from (9) produce more bias as compared to (10). Equation (9) and (10) satisfied the conditions $\omega_{|\eta_l|} > \ldots \omega_2 > \omega_1$ and $$\sum_{i=1}^{\eta} \omega_i = 1.$$

The weights are used such that the largest weight will be used for best solution and smallest weight will be used for worst solution. Numerical results show that this BED is better in performance than other proposed EDAs.

Quantum-inspired evolutionary algorithm [17] can be considered being in the family of EDAs and can be used for optimizing the selection of antennas and/or sensors.

3. Bio-Inspired Optimization (Bio) for Antenna Selection

In this section we describe a method for joint transmit and receive antenna selection that utilizes optimization algorithms inspired by biology such as social behavior of bird flocking or fish schooling. Like other evolutionary algorithms, bio-inspired optimization (BIO) algorithms are population-based search algorithms. In BIO, each individual is termed as an individual and a collection individuals is called a population. If we represent the optimization as minimizing the cost function of several variables, $x_1, x_2, \ldots, x_n$ or finding the value of vector $(x_1, x_2, \ldots, x_n)$ that best fit in according to fitness measure $F(x_1, x_2, \ldots, x_n)$, then vector $(x_1, x_2, \ldots, x_n)$ can be analogically viewed as a position of a particle in the n-dimensional space. Exploring through the space to find the best solution can be analogically viewed a particle flying in the space to find the best position.

Examples of BIO includes Particle Swarm Optimization (PSO) [14-15] and Biogeography-based Optimization (BBO) [16], etc.

PSO provides a population-based search procedure in which individuals (particles) change their position with time. In PSO, particles fly around (changes their position) in a multi-dimensional search space (set of all potential solutions). During flight, each particle adjusts its position on the basis of its own experience and on the basis of the neighboring particles' experience, making use of the best position encountered by itself and its neighbor. Thus, a PSO system combines local search methods with global search methods. Therefore each particle has a tendency to fly (move) towards better and better solutions [14].

We now present an embodiment, wherein each antenna selection is represented by a vector whose components take a binary digits 0 or 1. We refer to each vector in a population (a set of possible solutions) a particle. A particle may move to nearer and farther corners of the hypercube by flipping various numbers of bits.

The embodiment of particle swarm optimization (PSOP) for antenna/sensor selection being presented now can be characterized by parameters $(I_s, F, N, D, \tilde{X}^l, G_B^l, P_B^l, V^l, F_{Ter}, I_N^l)$, where 1. $I_s$ is the space of all potential solutions.
2. F denotes a fitness function. In this document, we defined F so that higher value means better fit. (Another convention is to use $-F$ as a cost function so that lower value of $-F$ means better fit.)
3. N is the size of population at a single iteration. Population is the collection of particles.
4. D is the dimension of the particle position (the length of the binary string to represent the particle position).
5. $\tilde{X}^l = [X_1^l, X_2^l \ldots, X_N^l]$ represents the position of the particles at the $l_{th}$ iteration, where $X_k^l$, $k=1, 2, \ldots, N$, represents the position of the particle indexed by k. Components of vector $X_k^l$ are denoted as $X_k^l = (x_{k,1}^l, x_{k,2}^l, \ldots, x_{k,D}^l)$, where $x_{k,i}^l \in \{0,1\}$, $i=1, 2, \ldots, D$.
6. We denote by $P_{bk}^l$ the best position that particle k has been up to the lth iteration (best among the history of particle k's positions); that is, $P_{bk}^l = \arg \max_{0 \leq i \leq l} F(X_k^i)$. We explicitly denote its components as $P_{bk}^l = (P_{kk,1}^l, P_{kk,2}^l, \ldots, P_{bk,D}^l)$. For N particle in the population collectively, we denote $P_B^l = [P_{b1}^l, P_{b2}^l, \ldots, P_{bN}^l]$.
7. $G_B^l$ is the globally best position of the among all particles up to the $l_{th}$ iteration in terms of fitness function F. That is, $G_B^l = \arg \max_{1 \leq k \leq N} F(P_{bk}^l) = \arg \max_{1 \leq k \leq N, 0 \leq i \leq l} F(X_k^i)$. We explicitly denote its components as $G_B^l = (g_{b1}^l, g_{b2}^l, \ldots, g_{bD}^l)$.
8. $V_k^l$ denotes what we referred to as the velocity of a particle. $V_k^l$, $k=1, 2, \ldots, N$, denotes the velocity of the particle indexed by k at the lth iteration. We also explicitly denote its components as $V_k^l = (v_{k,1}^l, v_{k,2}^l, \ldots, v_{k,D}^l)$. For N particle in the population collectively, we denote $V^l = [V_1^l, V_2^l, \ldots, V_N^l]$.
9. $F_{Ter}$ is the termination criteria.
10. $I_N^l$ denotes the population of N particles in the $l_{th}$ iteration.

Figure 7:
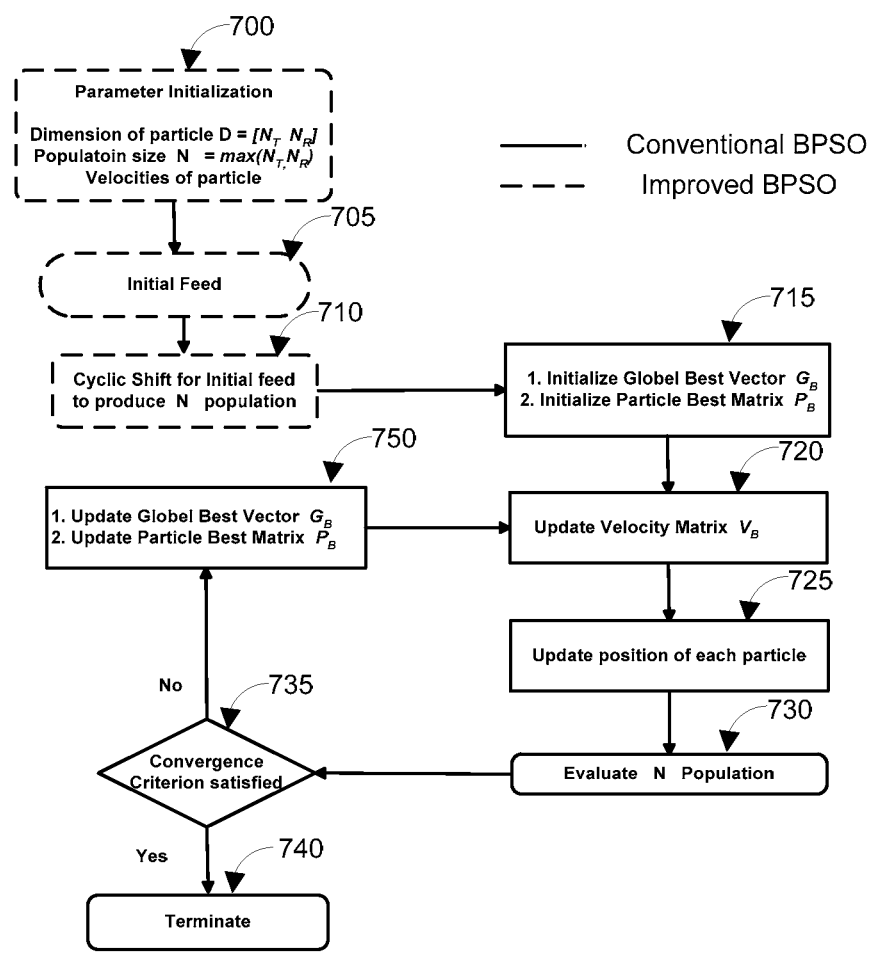
FIG. 7 is a flow chart of the improved method of applying a BPSO by introducing initial feed and cyclic shifted initial population.

Our method introduces modifications in conventional population-based algorithms to improve the efficiency of the proposed joint antenna selection method. The modifications include a predefined initial feed and cyclic shifted initial population. A preferred embodiment of this method is illustrated in FIG. 7 and is described as the following.

Step 1: Set the initial parameters 700 such that dimension D of each particle is $N_T + N_R$; the size of the population N is max $(N_T, N_R)$.

Step 2: Generate initial feed 705 as described in 500,505 (Adjacent feed) or 600,605 (Best Antenna Feed).

Step 3: Apply cyclic shift 710 to generate initial position of the population as described in 510,515 (cyclic shift on adjacent feed) or 610,615 (cyclic shift on best antenna feed). This initial population is a collection of particles. At the initial iteration l=0, initialize each particle's best position as $P_{b1}^0 = X_1^0, P_{b2}^0 = X_2^0, \ldots, P_{bN}^0 = X_N^0$ 715; initialize the global best as $G_B^0 = (g_{b1}^0, g_{b2}^0, \ldots, g_{bD}^0) = \arg \max_{1 \leq k \leq N} F(P_{bk}^0)$.

Figure 10:
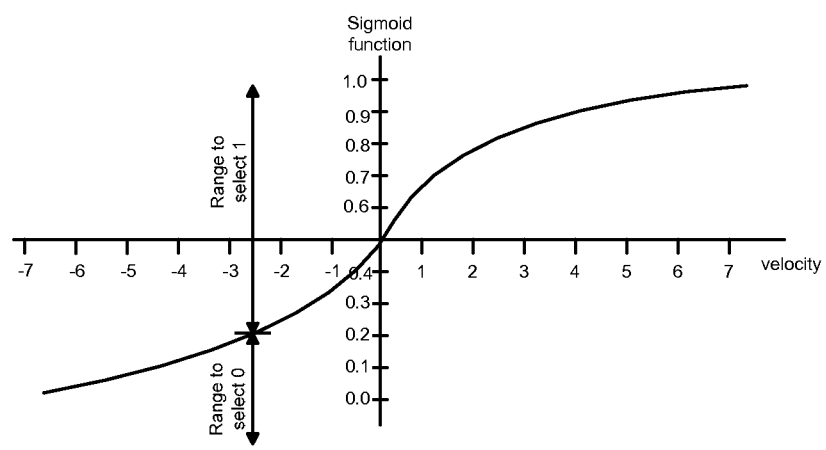
FIG. 10 illustrates the sigmoid function

For each particle k, initialize its velocity $V_k^0 = (v_{k,1}^0, v_{k,2}^0, \ldots, v_{k,D}^0)$ as the following.

$$v_{k,i}^0 = U(\overline{\omega}_{min}, \overline{\omega}_{max}) \quad (11)$$

where $U(\overline{\omega}_{min}, \overline{\omega}_{max})$ is the random variable uniformly distributed between $(\overline{\omega}_{min}, \overline{\omega}_{max})$. (For each combination of k and i, the random number is independently generated.) Parameters $\overline{\omega}_{max}$ and $\overline{\omega}_{min}$ are the velocity limits used at the initial iteration. As will be stated in Step 6, sigmoid function is used to generate the next position of each particle. The values of $\overline{\omega}_{max}$ and $\overline{\omega}_{min}$ should be chosen in such a way that the particle has no chance to get stuck in the initial position. One proposed method is to set the value $\overline{\omega}_{max} = \overline{\omega}\sigma^{-1}(q)$, where a $\sigma^{-1}$ denotes the inverse function of $\sigma$ and $\sigma$ is a sigmoid kind of function—for example, as in FIG. 10

$$\sigma(q) = \frac{1}{1 + \exp(-q)},$$

$q \in (-\infty, \infty)$ can be used. The value q is selected in a way that $\sigma^{-1}(q)$ should not be too large. Parameter $\overline{\omega}$ should be kept small to give randomness to the algorithm.

Step 4: Update the iteration counter.

Step 5: For each particle calculate the velocity 720

$$\begin{aligned} v_{k,i}^l = & v_{k,i}^{l-1} + c_1 \times U(0,1) \times (g_{bi}^{l-1} - x_{k,i}^{l-1}) + c_2 \times U(0,1) \times \\ & (p_{k,bi}^{l-1} - x_{k,i}^{l-1}), g_{bi}^{l-1} \bigstar \{0,1\}, x_{k,i}^{l-1} \in \{0,1\}, \\ & p_{k,bi}^{l-1} \in \{0,1\} \forall k=1, 2, \ldots, N \text{ and } \forall i=1, \\ & 2, \ldots, D \end{aligned} \quad (12)$$

where $U(0,1)$ is the uniform random variable between $(0,1)$, $c_1 > 0$ and $c_2 > 0$ are social and cognitive parameters to control the movement of the particle in any specific direction.

Step 6: Update the position of $k_{th}$ particle's $i_{th}$ element as 725 and FIG. 10

$$x_{k,i}^l = \begin{cases} 1 & \text{if } U(0,1) > \sigma(v_{k,i}^l) \\ 0 & \text{otherwise} \end{cases} \quad (13)$$

Step 7: Evaluate the current population 730 according to the fitness function F. Store these values in temporary variables $P_B^{Tmp} = [P_{b1}^{Tmp}, P_{b2}^{Tmp}, \ldots, P_{bN}^{Tmp}]$.

Step 8: If the convergence criterions satisfied then terminate 740 otherwise go to step 9.

Step 9: Update the $k_{th}$ particle best as 750

$$\text{if } F(P_{bk}^{Tmp}) > F(P_{bk}^{l-1}) \text{ then } P_{bk}^l = P_{bk}^{Tmp} \text{ else } P_{bk}^l = P_{bk}^{l-1} \quad (14)$$

Step 10: Update the global best as 750

$$\begin{aligned} G_B^{Tmp} = & \arg \max_{1 \leq k \leq N} F(P_{bk}^l) \text{ if } F(G_B^{Tmp}) > F(G_B^{l-1}) \\ & \text{then } G_B^l = G_B^{Tmp} \text{ else } G_B^l = G_B^{l-1} \end{aligned} \quad (15)$$

Step 11: Go to step 4 and repeat the steps

This embodiment includes modifications to conventional population-based algorithms to improve the efficiency of the proposed joint antenna selection method FIG. 7. The modifications include a predefined initial feed 705 and its cyclic shifts for designing the initial population 710. The detailed descriptions of designing initial populations are illustrated in section 2, as can be also used for designing the initial population of EDA. An embodiment of our method can also include thresholds on velocities of each particle. The particles in a bio-inspired optimization algorithm can get stuck at any position due to premature convergence. The premature convergence is due to the high variation in the velocities of the particles. We present an embodiment that avoids this problem by adding a threshold on velocities of each particle. We introduce a mechanism that avoids such premature convergence; namely, the idea is to adjust the velocities $[V_1^l, V_2^l, \ldots, V_N^l]$ at $l_{th}$ iteration. A preferred embodiment of this idea is to use thresholds. First we address the problem that a velocity value can cause the sigmoid function to prematurely converge to 0. To avoid this, we define thresholds $0.1 < \gamma_1, \gamma_2, \ldots, \gamma_N < 0.9$. At any iteration, if the sigmoid value is greater than $\gamma_i$, we set that value to $\gamma_I$ and compute the corresponding velocity to that value, so that some degree of randomness remains in the algorithm until the termination criterion is satisfied. A simpler application of this idea is to set the same threshold $\gamma = \gamma_1 = \gamma_2 = \ldots = \gamma_N$. Now we address the problem that a sigmoid value prematurely converges to 1. We define thresholds $0.1 < \alpha_1, \alpha_2, \ldots, \alpha_N < 0.9$. At any iteration, if the sigmoid value is less than $\alpha_i$, we set that value to $\alpha_i$, and compute the corresponding velocity to that value, so that some degree of randomness remains in the algorithm until the termination criterion is satisfied. A simpler application of this idea is to set the same threshold $\alpha = \alpha_1 = \alpha_2 = \ldots = \alpha_N$.

4. Simulation Results

For performance comparison, we present simulation results of the EDA joint antenna selection together with some of the existing selection techniques for JTRAS system. In this simulation, the channel is assumed to be quasi-static for time slots, but independent among different mobile devices.

Figure 8:
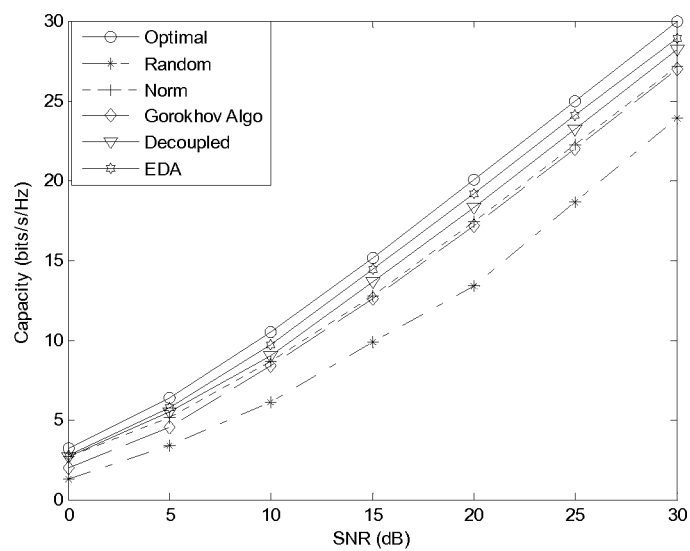
FIG. 8 illustrates performance of various antenna selection algorithms.
Figure 9:
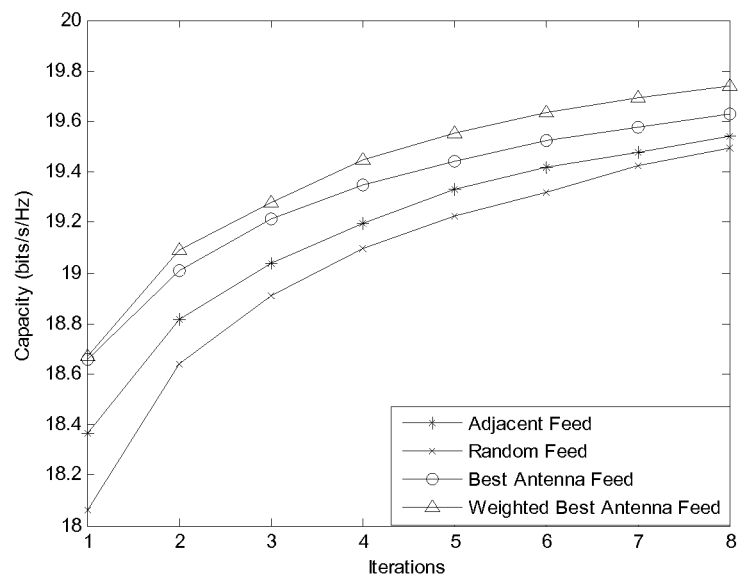
FIG. 9 illustrates performance of EDA with different initial feeds

FIG. 8 shows the performance of optimal, random, best norm, Gorokhov, decoupled and EDA for $N_t=3$, $N_T=6$, $N_R=4$, $N_R=18$, $|\Delta_t|=24$, $|\eta_t|=12$ and $I_t=10$. The proposed algorithm is compared with well known antenna selection algorithms e.g. Norm based algorithm [I], Gorokhov Algorithm [5], Decoupled Algorithm [13] and random selection. As shown by the simulation result, the performance of the proposed algorithm is closed to the exhaustive search algorithm (optimum algorithm). FIG. 9 shows how the performance of EDA effects with different initial feed. The parameters for EDA are $N_t=3$, $N_T=6$, $N_r=4$, $N_R=14$, $|\Delta_t|=14$, $|\eta_t|=7$ and $I_t=8$. Four different feeds are applied to the EDA joint antenna selection algorithm. These are random, adjacent, best antenna and biased antenna feed. Then these are passed to the cyclic shift register. The simulation result shows that antenna selection algorithm with deterministic initial feed has better performance than random feed. Also by applying biased weights performance is further improved.

What is claimed is:

1. A method for selecting transmit and/or receive antennas for systems conveying information from a transmitter side that has a single or plurality of transmit antennas to a receiver side that has a single or plurality of receive antennas, the method comprising:
   constructing a fitness function;
   obtaining an initial possible solution set comprising a plurality of valid antenna selections for the transmit and/or receive antennas, whereas each selection is a list of the antennas to be used and can be represented by a vector comprising a plurality of components, wherein the initial possible solution set comprises one or more selection vectors and their cyclic shifts within a subset, subsets, or the entire set of vector components, and making the initial possible solution set a current possible solution set;
   generating additional possible solution sets, comprising:
   a) determining a fitness of each of the possible antenna selections in the current possible solution set using said fitness function;
   b) constructing one or more additional possible antenna selections on the basis of the current and previous possible solution sets and fitnesses of their members;
   c) determining if said additional antenna selections contain one or more invalid selections, then removing the invalid selections or modifying the invalid selections to make them valid; and
   d) creating a new current possible solution set including at least the additional valid selections; and
   iterating a) through d) until a termination condition is satisfied.

2. A method according to claim 1 wherein:
constructing one or more additional possible antenna selections on the basis of the current and previous possible solution sets and fitnesses of their members comprises:
identifying a fittest subset of the plurality of possible antenna selections in the current possible solution set for which the fitnesses are best; and
based on the fittest subset, establishing an estimated probability distribution, the estimated probability distribution comprising a set of probability values, the probability values corresponding to possible values for elements of the selection vector; and
constructing one or more additional possible antenna selections consistent with the estimated probability distribution.

3. A method according to claim 2 wherein:
the antenna selection is one of a finite set of valid selections, the valid selection having a vector representation in which each valid selection can be represented by a specific selection of component values in a vector comprising one or more components, each component having a value selected from a corresponding finite set of valid values;
the estimated probability distribution has a representation as a collection of sub-distributions, each of the sub-distributions associated with a subset comprising one or more components in the vector representation of the valid antenna selections; and
each sub-distribution comprises an array of subset probability values, the subset probability values representing likelihoods that the one or more components of the associated subset of components of the vector representation take specific valid values of the corresponding sets of valid values;
wherein establishing the estimated probability distribution comprises setting values for the components of the arrays of the sub-distributions.

4. A method according to claim 3 wherein establishing the estimated probability distribution comprises:
for each of the sub-distributions, setting the probability values for the corresponding array of subset probability values according to a proportion of the possible antenna selections of the fittest subset that have the corresponding value or values in the associated subset of components of the vector representation.

5. A method according to claim 4 wherein establishing the estimated probability distribution comprises:
setting the corresponding probability value to be greater than the proportion when the proportion is lower than a first threshold; and
setting the corresponding probability value to be less than the proportion when the proportion is greater than a second threshold.

6. A method according to claim 3 comprising:
identifying a non-converged set comprising those of the subdistributions for which none of the subset probability values is closer to 1 than a threshold; and,
constructing a solution vector representing the antenna selection and performing an exhaustive search to determine values for those of the components of the solution vector that correspond to the sub-distributions of the non-converged set that result in the solution vector having the best fitness.

7. A method according to claim 2 wherein a range of each of the probability values is restricted to probability values between a lower threshold having a value greater than zero and an upper threshold having a value corresponding to a probability of less than one.

8. A method according to claim 2 wherein establishing the estimated probability distribution comprises setting the probability values such that all of the probability values lie in a range between a lower value representing a non-zero probability and an upper value representing a probability of less than certainty.

9. A method according to claim 2 wherein creating the new current possible solution set comprises including in the new current possible solution set one or more of the possible antenna selections of the fittest subset.

10. A method according to claim 2 wherein:
establishing the estimated probability distribution comprises setting each of the probability values based on a proportion of the corresponding elements in the possible antenna selections of the fittest subset that have a corresponding value or set of values.

11. A method according to claim 10 comprising setting the corresponding probability value to be greater than the proportion when the proportion is lower than a first threshold;
and setting the corresponding probability value to be less than the proportion when the proportion is greater than a second threshold.

12. A method according to claim 11 comprising, if the proportion is lower than the first threshold, setting the corresponding probability value to be equal to the first threshold.

13. A method according to claim 11 comprising, if the proportion is greater than the second threshold, setting the corresponding probability value to be equal to the second threshold.

14. A method according to claim 11 wherein separate first thresholds are provided for each of a plurality of the values.

15. A method according to claim 11 wherein separate second thresholds are provided for each of a plurality of the values.

16. A method according to claim 2 comprising determining that the termination condition is satisfied when a fitness of a fittest one of the plurality of antenna selections in the current possible solution set is better than a termination threshold.

17. A method according to claim 16 comprising determining that the termination condition is satisfied when a number of iterations has exceeded a limit.

18. A method according to claim 1 wherein obtaining the initial possible solution set comprises generating the plurality of possible antenna selections randomly or quasi-randomly.

19. A method according to claim 1 wherein obtaining the initial possible solution set comprises performing a sub-optimal search algorithm.

20. A method according to claim 2 wherein obtaining the initial possible solution set comprises performing a sub-optimal search algorithm.

21. A method according to claim 2 wherein constructing the fitness function is based in part on a previously-determined set of channel gains for channels between the transmit antennas and the receive antennas.

22. A method according to claim 2 wherein constructing the fitness function is based in part on the throughput of data that can be reliably conveyed from the transmitter side to the receiver side.

23. A method according to claim 2 wherein constructing the fitness function is based in part on the maximum throughput of data that can be conveyed from the transmitter side to the receiver side with a probability of bit error less than a specified value.

24. A method according to claim 2 wherein establishing the estimated probability distribution comprises computing a weighted average of a probability distribution derived from a current possible solution set of a prior iteration and a probability distribution derived from the current possible solution set.

25. A method according to claim 2 wherein estimated probability distribution comprises weighting possible antenna selections of the current possible solution set according to their fitnesses.

26. A method according to claim 2 comprising, after the termination condition is satisfied:
identifying one or more non-converged elements for which the corresponding probability values are below a threshold probability and performing a selective local search to identify values for the non-converged elements which result in a highest fitness.

27. A method according to claim 1 wherein constructing the one or more additional possible antenna selections comprises modifying one or more of the possible antenna selections in the current possible solution set according to a probabilistic or semi-probabilistic rule.

28. A method according to claim 1 wherein constructing the one or more additional possible antenna selections comprises generating one or more possible solutions in accordance with Particle Swarm Optimization.

29. A method according to claim 28 wherein the Particle Swarm Optimization's sigmoid-like value of each particle's velocity is kept between a high threshold and a low threshold.

30. A method according to claim 29 wherein separate high thresholds are provided for each of a plurality of particles.

31. A method according to claim 29 wherein separate low thresholds are provided for each of a plurality of particles.

32. A method according to claim 1 wherein constructing the one or more additional possible antenna selections comprises generating one or more possible solutions in accordance with a Quantum-Inspired Evolutionary algorithm.

33. A method according to claim 1 wherein constructing the one or more additional possible antenna selections comprises generating one or more possible solutions in accordance with a biogeography-based optimization algorithm.

34. A data receiver receiving data from one or more transmit antennas, the data receiver comprising:
one or more receive antennas and the data receiver is configured to select receive antennas to use for data reception and/or transmitters from which to receive data, the data receiver is configured to:
construct a fitness function;
obtain an initial possible solution set comprising a plurality of valid receive antenna and/or transmitter selections, whereas each selection is a list of receive antennas to be used and transmitters to receive data from and can be represented by a vector comprising a plurality of elements, wherein the initial possible solution set comprises one or more selection vectors and their cyclic shifts within a subset, subsets, or the entire set of vector components;

generate additional possible solution sets, comprising:
   a) determining a fitness of each of the possible selections in the current possible solution set using said fitness function;
   b) identifying a fittest subset of the plurality of possible selections in the current possible solution set for which the fitnesses are best;
   c) based on the fittest subset, establishing an estimated probability distribution, the estimated probability distribution comprising a set of probability values, the probability values corresponding to possible values for elements of the selection vector; and
   d) constructing one or more additional possible selections consistent with the estimated probability distribution; and
   e) determining if said additional selections contain one or more invalid selections, then removing the invalid selections or modifying the invalid selections to make them valid; and
   f) creating a new current possible solution set including at least the additional possible selections; and,
   iterating a) through f) until a termination condition is satisfied.

35. An apparatus according to claim 34 wherein constructing the one or more additional possible selections comprises modifying one or more of the possible selections in the current possible solution set according to a probabilistic or semi-probabilistic rule.

36. An apparatus according to claim 35 comprising generating the rule based at least in part upon the statistics of the current possible solution set.

37. A sensor selection method for systems comprising a plurality of sensors, the method comprising:
constructing a fitness function;
obtaining an initial possible solution set comprising a plurality of valid sensor selections for the plurality of sensors, whereas each selection is a list of the sensors to be used and can be represented by a vector comprising a plurality of components, wherein the initial possible solution set comprises one or more selection vectors and their cyclic shifts within a subset, subsets, or the entire set of vector components;
generating additional possible solution sets, comprising:
   a) determining a fitness of each of the possible sensor selections in the current possible solution set using said fitness function;
   b) constructing one or more additional possible sensor selections on the basis of the current and previous possible solution sets and fitnesses of their members;
   c) determining if said additional sensor selections contain one or more invalid selections, then removing the invalid selections or modifying the invalid selections to make them valid; and
   d) creating a new current possible solution set including at least the additional valid selections; and,
   iterating a) through d) until a termination condition is satisfied.

38. A method according to claim 37 wherein:
constructing one or more additional possible sensor selections on the basis of the current and previous possible solution sets and fitnesses of their members comprises:
identifying a fittest subset of the plurality of possible sensor selections in the current possible solution set for which the fitnesses are best; and
based on the fittest subset, establishing an estimated probability distribution, the estimated probability distribution comprising a set of probability values, the probability values corresponding to possible values for elements of the selection vector; and
constructing one or more additional possible sensor selections consistent with the estimated probability distribution.

39. A method according to claim 38 wherein:
the sensor selection is one of a finite set of valid selections, the valid selection having a vector representation in which each valid selection can be represented by a specific selection of component values in a vector comprising one or more components, each component having a value selected from a corresponding finite set of valid values;
the estimated probability distribution has a representation as a collection of sub-distributions, each of the sub-distributions associated with a subset comprising one or more components in the vector representation of the valid sensor selections; and
each sub-distribution comprises an array of subset probability values, the subset probability values representing likelihoods that the one or more components of the associated subset of components of the vector representation take specific valid values of the corresponding sets of valid values;
wherein establishing the estimated probability distribution comprises setting values for the components of the arrays of the sub-distributions.

40. A method according to claim 39 wherein establishing the estimated probability distribution comprises:
for each of the sub-distributions, setting the probability values for the corresponding array of subset probability values according to a proportion of the possible sensor selections of the fittest subset that have the corresponding value or values in the associated subset of components of the vector representation.

41. A method according to claim 39 comprising:
identifying a non-converged set comprising those of the subdistributions for which none of the subset probability values is closer to 1 than a threshold; and,
constructing a solution vector representing the sensor selection and performing an exhaustive search to determine values for those of the components of the solution vector that correspond to the sub-distributions of the non-converged set that result in the solution vector having the best fitness.

42. A method according to claim 38 wherein a range of each of the probability values is restricted to probability values between a lower threshold having a value greater than zero and an upper threshold having a value corresponding to a probability of less than one.

43. A method according to claim 38 wherein:
establishing the estimated probability distribution comprises setting each of the probability values based on a proportion of the corresponding elements in the possible sensor selections of the fittest subset that have a corresponding value or set of values.

44. A method according to claim 38 comprising determining that the termination condition is satisfied when a fitness of a fittest one of the plurality of sensor selections in the current possible solution set is better than a termination threshold.

45. A method according to claim 44 comprising determining that the termination condition is satisfied when a number of iterations has exceeded a limit.

46. A method according to claim 37 wherein obtaining the initial possible solution set comprises generating the plurality of possible sensor selections randomly or quasi-randomly.

47. A method according to claim 37 wherein obtaining the initial possible solution set comprises performing a sub-optimal search algorithm.

48. A method according to claim 37 wherein constructing the one or more additional possible sensor selections comprises modifying one or more of the possible selections in the current possible solution set according to a probabilistic or semi-probabilistic rule.

49. A method according to claim 48 comprising generating the rule based at least in part upon the statistics of the current possible solution set.

* * * * *